(12) United States Patent
Aguayo Gonzalez et al.

(10) Patent No.: US 10,859,609 B2
(45) Date of Patent: Dec. 8, 2020

(54) METHODS AND APPARATUSES FOR CHARACTERISTIC MANAGEMENT WITH SIDE-CHANNEL SIGNATURE ANALYSIS

(71) Applicant: Power Fingerprinting Inc., Vienna, VA (US)

(72) Inventors: Carlos R. Aguayo Gonzalez, Reston, VA (US); Jeffrey H. Reed, Blacksburg, VA (US); Steven C. Chen, Potomac, MD (US)

(73) Assignee: Power Fingerprinting Inc., Vienna, VA (US)

( * ) Notice: Subject to any disclaimer, the term of this patent is extended or adjusted under 35 U.S.C. 154(b) by 585 days.

(21) Appl. No.: 15/639,924

(22) Filed: Jun. 30, 2017

(65) Prior Publication Data

US 2018/0011130 A1    Jan. 11, 2018

Related U.S. Application Data

(60) Provisional application No. 62/359,047, filed on Jul. 6, 2016.

(51) Int. Cl.
*G01R 19/04* (2006.01)
*G06F 11/30* (2006.01)
(Continued)

(52) U.S. Cl.
CPC .......... *G01R 19/04* (2013.01); *G06F 11/0754* (2013.01); *G06F 11/0793* (2013.01);
(Continued)

(58) Field of Classification Search
CPC .................................................. G01R 19/04
See application file for complete search history.

(56) References Cited

U.S. PATENT DOCUMENTS 7,093,147 B2    8/2006    Farkas et al.
7,515,094 B2    4/2009    Keller, III
(Continued)

FOREIGN PATENT DOCUMENTS

CN          201170900 Y    12/2008
WO    WO-1994/011801         5/1994
(Continued)

OTHER PUBLICATIONS

Tektronix, "AC Current Probes: CT1—CT2—CT6 Data Sheet", Test Equipment Depot [online] 2019. [retrieved on Apr. 3, 2019] Retrieved from the Internet:<http://www.testequipmentdepot.com/tektronix/accessories/oscilloscope-probe/tek-ct6-current-probe.htm?ref=gbase&gclid=EAlaIQobChM16YCf7u-z4QlVgV6GCh3BGAvLEAQYAiABEgl3cvD_BwE>, 5 pages.
(Continued)

*Primary Examiner* — Manuel A Rivera Vargas
(74) *Attorney, Agent, or Firm* — Cooley LLP

(57) ABSTRACT

Some embodiments described herein include an apparatus having a processor communicatively coupled to a memory. The processor is configured to monitor, at a characteristic controller, a first characteristic of an electronic device. The processor is then configured to receive side-channel signature analysis of the electronic device from a signature analyzer. The processor is configured to determine if the first characteristic of the electronic device has changed or will change in a predefined period of time based on the side-channel signature analysis. The processor is then configured to adjust a second characteristic of the electronic device and/or filtering characteristics such that the side-channel signature analysis reflects predefined side-channel behavior.

20 Claims, 6 Drawing Sheets

(51) Int. Cl.
  *G06F 21/56* (2013.01)
  *H04L 9/00* (2006.01)
  *G09C 1/00* (2006.01)
  *G06F 11/07* (2006.01)

(52) U.S. Cl.
  CPC .......... *G06F 11/3062* (2013.01); *G06F 21/56* (2013.01); *G09C 1/00* (2013.01); *H04L 9/003* (2013.01)

(56) References Cited

U.S. PATENT DOCUMENTS

| | | |
|---|---|---|
| 7,555,787 B2 | 6/2009 | Clercq |
| 7,853,437 B2 | 12/2010 | Seguin et al. |
| 7,869,977 B2 | 1/2011 | Lewis et al. |
| 7,877,621 B2 | 1/2011 | Jacoby et al. |
| 8,069,490 B2 | 11/2011 | Gross et al. |
| 8,122,498 B1 | 2/2012 | Gordon et al. |
| 8,242,793 B2 | 8/2012 | Kumhyr et al. |
| 8,245,295 B2 | 8/2012 | Park et al. |
| 8,255,341 B2 | 8/2012 | Gross et al. |
| 8,332,945 B2 | 12/2012 | Kim et al. |
| 8,457,913 B2 | 6/2013 | Zwinger et al. |
| 8,537,050 B2 | 9/2013 | Freeman et al. |
| 8,643,539 B2 | 2/2014 | Pauly et al. |
| 8,825,823 B2 | 9/2014 | Keller, III |
| 8,892,903 B1 | 11/2014 | Trimberger |
| 9,059,189 B2 | 6/2015 | Keller, III |
| 9,262,632 B2 | 2/2016 | Reed et al. |
| 9,268,938 B1* | 2/2016 | Aguayo Gonzalez ....................... G01R 21/00 |
| 9,411,009 B1 | 8/2016 | Gonzalez et al. |
| 9,558,349 B2 | 1/2017 | Reed et al. |
| 9,558,350 B2 | 1/2017 | Reed et al. |
| 1,015,727 A1 | 12/2018 | Gonzalez et al. |
| 2001/0033180 A1 | 10/2001 | Swart et al. |
| 2001/0037458 A1 | 11/2001 | Kean |
| 2002/0001337 A1 | 1/2002 | Chauncey et al. |
| 2002/0061668 A1 | 5/2002 | Fujimura |
| 2002/0079881 A1 | 6/2002 | Hiromatsu |
| 2003/0070105 A1 | 4/2003 | Launiainen |
| 2004/0068386 A1 | 4/2004 | Smith et al. |
| 2005/0144612 A1 | 6/2005 | Wang et al. |
| 2005/0184028 A1 | 8/2005 | Baur et al. |
| 2005/0184236 A1 | 8/2005 | Baur et al. |
| 2006/0082488 A1 | 4/2006 | Keller, III |
| 2006/0164115 A1 | 7/2006 | Komiya et al. |
| 2006/0253762 A1 | 11/2006 | Schalick |
| 2007/0024293 A1 | 2/2007 | Kosaka et al. |
| 2007/0028129 A1 | 2/2007 | Schumacher et al. |
| 2007/0220263 A1 | 9/2007 | Ziener et al. |
| 2007/0257025 A1 | 11/2007 | Nordstrom et al. |
| 2007/0283166 A1 | 12/2007 | Yami et al. |
| 2008/0049853 A1 | 2/2008 | Franceschini et al. |
| 2008/0054925 A1 | 3/2008 | Ohkura |
| 2008/0088336 A1 | 4/2008 | Pommerenke |
| 2008/0091975 A1* | 4/2008 | Kladko ................. G06F 11/277 714/25 |
| 2008/0115001 A1 | 5/2008 | Schuette |
| 2008/0191726 A1 | 8/2008 | Ku et al. |
| 2008/0276111 A1 | 11/2008 | Jacoby et al. |
| 2009/0019546 A1 | 1/2009 | Park et al. |
| 2009/0044057 A1 | 2/2009 | Choate et al. |
| 2009/0049549 A1 | 2/2009 | Park et al. |
| 2009/0099830 A1 | 4/2009 | Gross et al. |
| 2009/0216498 A1 | 8/2009 | Seguin et al. |
| 2009/0306920 A1 | 12/2009 | Zwinger et al. |
| 2010/0030497 A1 | 2/2010 | Zavadsky et al. |
| 2010/0033199 A1 | 2/2010 | Komatsu et al. |
| 2010/0033386 A1 | 2/2010 | Lewis et al. |
| 2010/0100694 A1 | 4/2010 | Maheffey et al. |
| 2010/0100964 A1 | 4/2010 | Mahaffey et al. |
| 2010/0123453 A1 | 5/2010 | Pauly et al. |
| 2010/0132048 A1 | 5/2010 | Hall et al. |
| 2010/0161525 A1 | 6/2010 | Gross et al. |
| 2010/0213960 A1 | 8/2010 | Mok et al. |
| 2010/0237854 A1 | 9/2010 | Kumhyr et al. |
| 2010/0313270 A1 | 12/2010 | Kim et al. |
| 2010/0332199 A1 | 12/2010 | Dhanekula et al. |
| 2011/0002186 A1 | 1/2011 | Buonpane et al. |
| 2011/0095934 A1 | 4/2011 | Freeman et al. |
| 2012/0179812 A1 | 7/2012 | Keller, III |
| 2012/0223403 A1 | 9/2012 | Keller, III et al. |
| 2012/0226463 A1 | 9/2012 | Keller, III et al. |
| 2012/0278893 A1 | 11/2012 | Jyothi et al. |
| 2013/0044003 A1 | 2/2013 | Eguro et al. |
| 2013/0108145 A1 | 5/2013 | Cobb et al. |
| 2013/0127442 A1 | 5/2013 | Satoh et al. |
| 2013/0318607 A1 | 11/2013 | Reed et al. |
| 2014/0100807 A1 | 4/2014 | Rosenblatt et al. |
| 2014/0182373 A1 | 7/2014 | Sbihli et al. |
| 2014/0195184 A1 | 7/2014 | Maeda et al. |
| 2014/0218229 A1 | 8/2014 | Pauly et al. |
| 2014/0223554 A1 | 8/2014 | Roden, III |
| 2014/0259161 A1 | 9/2014 | Kastner et al. |
| 2014/0304826 A1 | 10/2014 | Bytheway et al. |
| 2015/0009073 A1 | 1/2015 | Keller, III |
| 2016/0342791 A1 | 11/2016 | Gonzalez et al. |
| 2017/0310482 A1 | 10/2017 | Reed et al. |

FOREIGN PATENT DOCUMENTS

| | | |
|---|---|---|
| WO | WO-1996/018934 | 6/1996 |
| WO | WO-2010/044069 | 4/2010 |
| WO | WO-2012/061663 | 5/2012 |
| WO | WO-2013/131073 | 9/2013 |
| WO | WO-2014/144857 | 9/2014 |

OTHER PUBLICATIONS

Tektronix, "Tektronix CT6 Current Probe, High Freq/Small Geometry (w/ Certificate of Traceable Calibration)—at the Test Equipment Depot", Test Equipment Depot [online] 2019. [retrieved on Apr. 3, 2019] Retrieved from the Internet:<http://www.testequipmentdepot.com/tektronix/accessories/oscilloscope-probe/tek-ct6-current-probe.htm?ref=gbase&gclid=EAlaIQobChMl6YCf7u-z4QlVgV6GCh3BGAvLEAQYAiABEgl3cvD_BwE>, 2 pages.

Extended Search Report for European Application No. 16800427.3, dated Sep. 25, 2018, 9 pages.

Gonzalez, Carlos R. Aguayo, and Jeffrey H. Reed. "Power fingerprinting in SDR & CR integrity assessment." Military Communications Conference, 2009. MILCOM 2009. IEEE. IEEE, 2009.

Gonzalez, CR Aguayo, and Jeffrey H. Reed. "Dynamic power consumption monitoring in SDR and CR regulatory compliance." SDR Forum Conference. DC. 2009.

Tehranipoor, Mohammad, and Farinaz Koushanfar. "A survey of hardware Trojan taxonomy and detection." IEEE Design & Test of Computers (2010).

Agrawal, Dakshi, et al. "Trojan detection using IC fingerprinting." Security and Privacy, 2007. SP'07. IEEE Symposium on. IEEE, 2007.

Plusquellic, James F., Donald M. Chiarulli, and Steven P. Levitan. "Digital integrated circuit testing using transient signal analysis." Test Conference, 1996. Proceedings., International. IEEE, 1996.

Germida, Amy, et al. "Defect detection using power supply transient signal analysis." Test Conference, 1999. Proceedings. International. IEEE, 1999.

Baturone, I., et al. "Supply current monitoring for testing CMOS analog circuits." Proc. XI Conference on Design of Circuits and Integrated Systems (DCIS), Sitges. 1996.

Stone, Samuel, and Michael Temple. "Radio-frequency-based anomaly detection for programmable logic controllers in the critical infrastructure." International Journal of Critical Infrastructure Protection 5.2 (2012): 66-73.

Guin, Ujjwal, et al. "Counterfeit Integrated Circuits: A Rising Threat in the Global Semiconductor Supply Chain." Proceedings of the IEEE 102.8 (2014): 1207-1228.

Clark, Shane S., "The security and privacy implications of energy-proportional computing." Diss. University of Massachusetts Amherst, 2013.

(56) References Cited

OTHER PUBLICATIONS

Stone, Samuel J., "Radio Frequency Based Programmable Logic Controller Anomaly Detection," No. AFIT-ENG-DS-13-S-05. Air Force Inst of Tech Wright-Patterson AFB Oh Graduate School Of Engineering and Management, 2013.
Reed, J.H. et al. "Enhancing Smart Grid Cyber Security using Power Fingerprinting," IEEE, Future of Instrumentation International Workshop (FIIW), 2012, pp. 1-3.
Soll, O, et al. "EM-based Detection of Hardware Trojans on FPGAs," IEEE International Symposium on Hardware-Oriented Security and Trust (HOST), 2014, pp. 84-87.
Cardoso, Bill et al., "X-Ray Inspection Techniques to Identify Counterfeit Electronic Components", ECN Magazine, Mar. 11, 2014, 6 pgs., Downloaded on Nov. 11, 2015 at http://www.ecnmag.com/articles/2014/03/x-ray-inspection-techniques-identify-counterfeit-electronic-components.
Extended Search Report for European Application No. 11838845.3, dated Jul. 7, 2015.
International Search Report and Written Opinion for PCT/US16/18940, dated May 11, 2016.
International Search Report and Written Opinion for PCT/US2011/059244, dated May 22, 2012.
International Search Report and Written Opinion for PCT/US2017/040676, dated Sep. 12, 2017.
Office Action for U.S. Appl. No. 14/720,497, dated Aug. 7, 2015.
Office Action for U.S. Appl. No. 13/883,105, dated Jun. 2, 2015.
Office Action for U.S. Appl. No. 14/950,498, dated May 31, 2016.
Office Action for U.S. Appl. No. 14/950,676, dated May 27, 2016.
Office Action for Russian Application No. 2013125468, dated Feb. 19, 2016.
Office Action for Mexican Application No. MX/a/2013/005074, dated Jan. 15, 2016.
Office Action for Japanese Application No. 2013-537844, dated Oct. 28, 2015.
First Office Action for Chinese Application No. 201180063979.1, dated Jun. 2, 2015.
Second Office Action for Chinese Application No. 201180063979.1, dated Feb. 1, 2016.
Patent Examination Report No. 1 for Australian Application No. 2011323210, dated Mar. 16, 2016.
U.S. Appl. No. 14/720,497, filed May 22, 2015, entitled Systems, Methods, and Apparatuses for Intrusion Detection and Analytics Using Power Characteristics Such As Side-Channel Information Collection.

\* cited by examiner

METHODS AND APPARATUSES FOR CHARACTERISTIC MANAGEMENT WITH SIDE-CHANNEL SIGNATURE ANALYSIS

CROSS-REFERENCE TO RELATED APPLICATIONS

This application is non-provisional of and claims priority under 35 U.S.C. § 119 to U.S. provisional application Ser. No. 62/359,047, filed Jul. 6, 2016, entitled "Methods and Apparatuses for Characteristic Management with Side-channel Signature Analysis."

This application is related to U.S. patent application Ser. No. 13/883,105, having a 35 U.S.C. § 371(c) date of Aug. 15, 2013, entitled "Using Power Fingerprinting (PFP) To Monitor The Integrity And Enhance Security Of Computer Based Systems."

This application is also related to U.S. patent application Ser. No. 14/720,497, filed on May 22, 2015, entitled "Systems, Methods, and Apparatuses For Intrusion Detection And Analytics Using Power Characteristics Such As Side-Channel Information Collection."

The contents of the aforementioned applications are incorporated herein by reference in their entirety.

BACKGROUND

Some embodiments described herein relate generally to methods and apparatus for a signature analysis using side-channel information. In particular, but not by way of limitation, some embodiments described herein relate to methods and apparatus for a characteristic management system with side-channel signature analysis capabilities to improve anomaly detection in an electronic device.

An electronic device or system is powered by electrical power, which can facilitate data exchange and storage at circuit units. For example, in Complementary Metal-Oxide-Semiconductor (CMOS) digital circuits, with every bit transition a transient current drain results from a brief short circuit in the gates and the charge and discharge of parasitic capacitance at the outputs of the circuit. Hence, the total power consumed in a specific clock cycle is determined by the specific instruction sequence executed, as well as the addresses and parameters of the specific instruction sequence. When a disruption of the execution of the specific instruction sequence occurs (i.e., an anomaly), such disruption is reflected in the consumption of the electric power.

Some disruptions or changes in the typical consumption of electrical power may be intended. For example, some circuits are operatively coupled to power management systems. Such power management systems can affect the detection of anomalies.

Accordingly, a need exists for methods and apparatus for managing characteristics (e.g., power) during an anomaly detection using side-channel information signature analysis.

SUMMARY

Some embodiments described herein include an apparatus having a processor communicatively coupled to a memory. The processor is configured to monitor, at a characteristic controller, a first characteristic of an electronic device. The processor is then configured to receive side-channel signature analysis of the electronic device from a signature analyzer. The processor is configured to determine if the first characteristic of the electronic device has changed or will change in a predefined period of time based on the side-channel signature analysis. The processor is then configured to adjust a second characteristic of the electronic device and/or filtering characteristics such that the side-channel signature analysis reflects predefined side-channel behavior.

DETAILED DESCRIPTION

Figure 1:
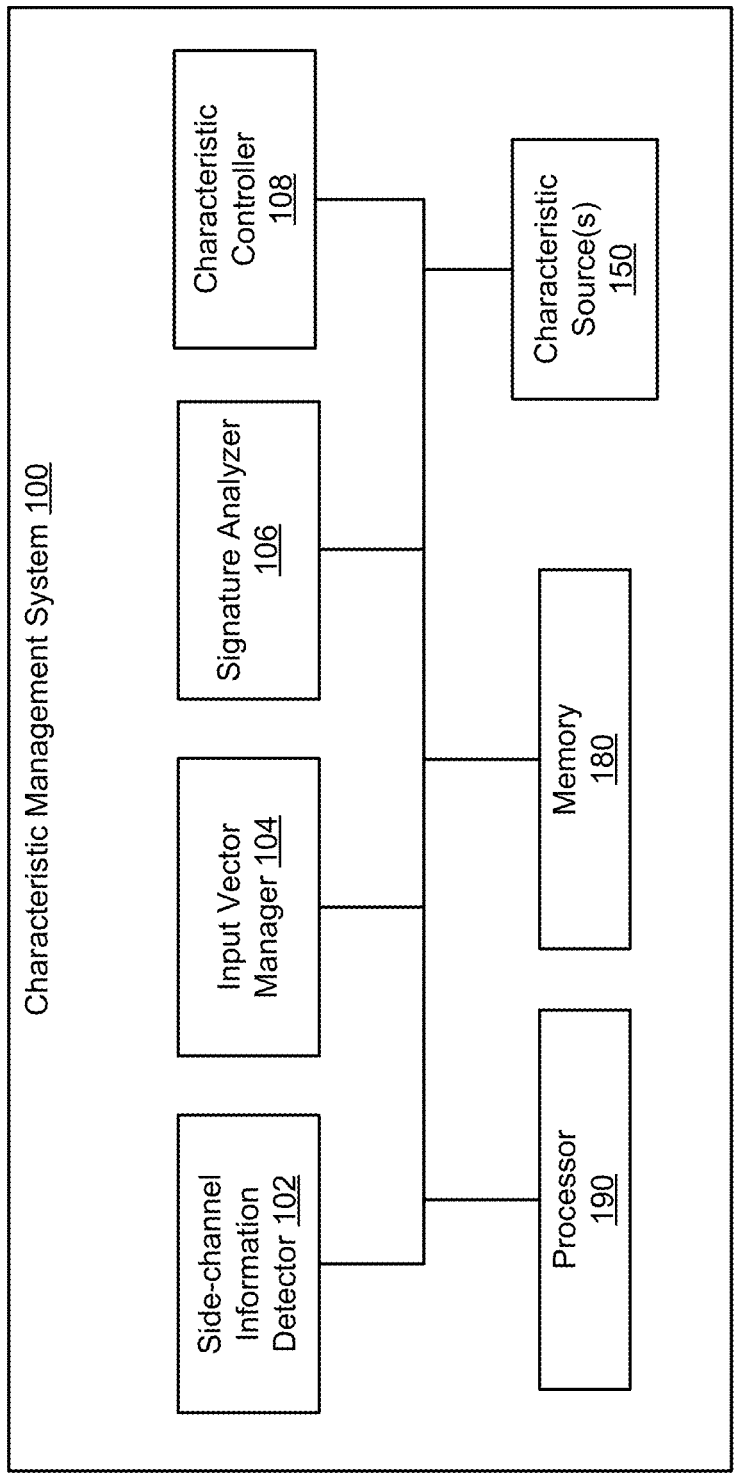
FIG. 1 is a schematic diagram illustrating aspects of a characteristic management system, according to an embodiment.

Some embodiments described herein include an apparatus having a processor communicatively coupled to a memory. The processor is configured to monitor, at a characteristic controller, a first characteristic of an electronic device. The processor is then configured to receive side-channel signature analysis of the electronic device from a signature analyzer. The processor is configured to determine if the first characteristic of the electronic device has changed or will change in a predefined period of time based on the side-channel signature analysis. The processor is then configured to adjust a second characteristic of the electronic device and/or filtering characteristics such that the side-channel signature analysis reflects predefined side-channel behavior.

Embodiments disclosed herein relate to a characteristic management system that can monitor, control, and manage a characteristic (e.g., power, voltage, current, frequency) associated with an electronic device to improve anomaly detection using side-channel information in a signature analysis. The anomaly(ies) includes, but not limited to a performance anomaly, a power consumption anomaly, an output anomaly, malicious intrusions, unauthorized modifications, and tampering in digital circuits and computer-based systems, including, for example, critical embedded systems, coprocessors, and field-programmable gate arrays (FPGAs). In some instances, a physical side-channel (e.g., indirect measure of program execution such as power consumption, electromagnetic emissions, and other characteristics of physical signals such as current, voltage, temperature, vibration, light, delay, impedance, vibration, pressure, global positioning system coordinates, and/or the like) can be used to assess the execution status in a target processor system (e.g., digital circuit or computer system). This process of obtaining the execution status in a target processor system is referred herein as "fingerprinting." An assessment can be performed using a monitor to detect when an unauthorized execution has managed to disrupt or modify the normal (or expected) operation of the target device or system. This process of detecting program execution anomaly is referred herein as "fingerprinting analysis" or "signature analysis"; methods and apparatuses that implement fingerprinting analysis can be referred to as a fingerprinting system or a system, which can be embodied in a number of different ways and forms. In some instances, such fingerprinting analysis can use, for example, a physical side channel to detect an anomaly in the operation of a target device or system. An example of a fingerprinting system is discussed in U.S. patent application Ser. No. 13/883,105, having a 35 U.S.C. § 371(c) date of Aug. 15, 2013, entitled "Using Power Fingerprinting (PFP) To Monitor The Integrity And Enhance Security Of Computer Based Systems." An example of a side-channel monitoring system is discussed in U.S. patent application Ser. No. 14/720,497, filed on May 22, 2015, entitled "Systems, Methods, and Apparatuses For Intrusion Detection And Analytics Using Power Characteristics Such As Side-Channel Information Collection."

As used in this specification, the singular forms "a," "an" and "the" include plural referents unless the context clearly dictates otherwise. Thus, for example, the term "an electronic device" is intended to mean a single electronic device or multiple electronic devices. For another example, the term "a characteristic" can mean a single characteristic or multiple characteristics.

FIG. 1 is a schematic diagram illustrating aspects of a characteristic management system, according to an embodiment. The characteristic management system 100 can be configured to monitor, control, and manage a characteristic (e.g., power, voltage, current, frequency) associated with electronic circuit(s) and/or electronic device(s) (referred hereinafter as devices, electronic devices, target devices) (not shown in FIG. 1) to improve anomaly detection using side-channel information in a signature analysis. The electronic circuit(s) can include, for example, critical embedded systems, coprocessors, and field-programmable gate arrays (FPGAs). The electronic device(s) can be or include, for example, computers, cell phones, digital cameras, tablets, electrical circuit boards, and/or electronic components. The electronic device(s) can include analog circuits and/or digital circuits. The electronic device(s) can also include a pluggable device, such as a Universal Serial Bus (USB) flash drive.

The characteristic management system 100 can also be configured to detect anomaly(ies) and assess integrity of the electronic device. The characteristic management system 100 can be configured to provide a constant voltage and/or current to the electronic device and in some situations auto-detect the characteristic requirements (e.g., voltage, current) of the electronic device. The characteristic management system 100 can also be configured to monitor and adjust the input voltage, the input current and/or frequency of the input voltage of the electronic device to minimize power consumption at the electronic device. When it is determined that there is an anomaly based on a signature analysis using the side-channel information, the characteristic management system 100 can be configured to implement remedial processes, such as shutting down the electronic device, notifying an entity of the anomaly, or resetting the electronic device to a known state.

In some implementations, the electronic device (or a chip in the electronic device) can include a power management system which provides a constant voltage and/or current to the electronic device (or the chip). The power management system can be configured to monitor and adjust the input voltage, current, and/or frequency of the input voltage of the electronic device (or the chip). A characteristic controller (such as the characteristic controller 108 discussed below in FIG. 1) can control the power management system (and/or the power output from the power management system and input into the rest of the electronic device). In such a situation, the characteristic controller 108 can control the characteristic source 150 (e.g., a power source) or control/modify the power output of the power management system.

In some implementations, the characteristic management system 100 can be a physical device external to the electronic device(s) (or target device(s)). In other implementations, the characteristic management system 100 can be a component within the electronic device or on a chip of the electronic device. In such implementations, the characteristic management system 100 can perform the characteristic management process described herein on the electronic device or the chip within which it is located. This allows the characteristic management process to be self-contained within the electronic device or the chip such that external processes or devices need not be involved in the performance of the characteristic management process described herein. In such situations, the chip can also include a power management system which provides a constant voltage and/or current to the electronic device. A characteristic controller (such as the characteristic controller 108 discussed below in FIG. 1) can control the power management system (and/or the power output from the power management system and input into the rest of the chip). In some instances, the characteristic management system 100 can perform the characteristic management process on a pluggable device, such as a USB flash drive, plugged into an electronic device.

When the characteristic management system 100 is a component on a chip of the electronic device, the side-channel information from known legitimate and/or known non-legitimate devices (against which the side-channel responses from the chip of the electronic device is compared) are also stored on the chip. In such arrangements, when an unauthorized party modifies the chip (e.g., via malicious intrusions), the reference side-channel information from the known legitimate and/or known non-legitimate devices can be correspondingly modified without authorizations. Therefore, the modified chip may be inaccurately assessed as a legitimate (or trusted) device rather than properly assessed as a non-legitimate (or untrusted or tampered) device. To prevent this, a copy of the reference side-channel information from the known legitimate and/or known non-legitimate devices can be maintained off-chip, in addition to the copy on-chip. In such a situation, for example, the side-channel responses from the chip of the electronic device can be compared to the reference side-channel information on-chip and the reference side-channel information off-chip. If the comparisons with the reference side-channel information off-chip yields a different result from the comparisons with the reference side-channel information on-chip, a determination can be made that the chip of the electronic device and the reference side-channel information on-chip have been modified without authorization.

As shown in FIG. 1, the characteristic management system 100 includes a processor 190, a memory 180, a side-channel information detector 102, an input vector manager 104, a signature analyzer 106, a characteristic controller 108, and a characteristic source(s) 150. In some embodiments, the characteristic management system 100 can be a single physical device. In other embodiments, the characteristic management system 100 can include multiple physical devices (e.g., operatively coupled by a network), each of which can include one or multiple components shown in FIG. 1.

Each component in the characteristic management system 100 can be operatively coupled to each remaining component. Each component in the characteristic management system 100 can be any combination of hardware and/or software (stored and/or executing in hardware) capable of performing one or more specific functions associated with that component.

The memory 180 can be, for example, a random-access memory (RAM) (e.g., a dynamic RAM, a static RAM), a flash memory, a removable memory, a hard drive, a database and/or so forth. In some embodiments, the memory 180 can include, for example, a database, process, application, virtual machine, and/or some other software modules (stored and/or executing in hardware) or hardware modules configured to execute a characteristic management process and/or one or more associated methods. In such embodiments, instructions to execute the characteristic management process and/or the associated methods can be stored within the memory 180 and executed at the processor 190. In some embodiments, data can be stored in the memory 180 including for example data related to the electronic device, its measured characteristics (e.g., measured side-channel information from the electronic device, the characteristics (e.g., voltage, current, power, frequency, etc.) generated by the characteristic source 150, etc.), and its reference characteristics (e.g., reference side-channel information from known legitimate or non-legitimate devices).

The processor 190 can be configured to control, for example, the operations of a communications interface (not shown in FIG. 1), write data into and read data from the memory 180, and execute the instructions stored within the memory 180. In some embodiments, the processor 190 can be a general purpose processor, a Field Programmable Gate Array (FPGA), an Application Specific Integrated Circuit (ASIC), a Digital Signal Processor (DSP), and/or the like. The processor 190 can also be configured to execute and/or control, for example, the operations of the side-channel information detector 102, the input vector manager 104, the signature analyzer 106, the characteristic controller 108, and the characteristic source(s) 150, as described in further detail herein. In some embodiments, under the control of the processor 190 and based on the methods or processes stored within the memory 180, the side-channel information detector 102, the input vector manager 104, the signature analyzer 106, the characteristic controller 108, and the characteristic source(s) 150 can be configured to execute a characteristic management process, as described in further detail herein.

Each of the side-channel information detector 102, the input vector manager 104, the signature analyzer 106, the characteristic controller 108, and the characteristic source(s) 150 can be a hardware module (e.g., critical embedded systems, coprocessors, and field-programmable gate arrays (FPGAs)) and/or software module (e.g., stored in a memory such as the memory 180 and/or executing in hardware such as the processor 190) in the characteristic management system 100. Each of the side-channel information detector 102, the input vector manager 104, the signature analyzer 106, the characteristic controller 108, and the characteristic source(s) 150 in the characteristic management system 100 can be operatively coupled to each remaining component. Specially, the side-channel information detector 102 can include a physical hardware (e.g., sensor) to measure side-channel information (such as temperature, power, EM emissions, circuit delay, and/or the like) of the electronic device. The characteristic source(s) 150 can include a physical hardware (e.g., a voltage source, a current source, a power source) to provide voltage, current or power to the electronic device. In some implementations, a side-channel information detector 102 and the characteristic source 150 can be a single physical hardware. For example, a power sensor can be placed on the power source.

The side-channel information detector 102 can measure side-channel information (such as temperature, power, EM emissions, circuit delay, and/or the like) of the electronic device using one or more sensors (not shown in FIG. 1) located at the electronic device under a given input or a set of given inputs. The sensors that can be used to capture side-channel information include, but are not limited to: acoustic and vibration detectors, temperature detectors, electro-magnetic (such as electric current (e.g. current probes, hall effect sensors, radio frequency (RF) transformers, current mirrors, shunt resistors, etc.) detectors, electric and magnetic flux detectors, electromagnetic radiation detectors, near-field radiation detectors, etc.), position detectors, distance detectors, angle detectors, speed detectors, acceleration detectors, light and optical detectors, environmental detectors: moisture, humidity, pressure, force, level, circuit delay, and/or the like. The given input or the set of given inputs can be provided by the input vector manager 104 of the electronic device itself or a remote compute device. In some implementations, a sensor (or a detector) can be remote from the characteristic management system 100 and its detected sensor data can be sent to the side-channel information detector 102 for further processing. In some instances, the side-channel information detector 102 can measure side-channel information of a pluggable device, such as a USB flash drive, plugged into the electronic device.

The input vector manager 104 can select inputs (or input vectors) that activates an electronic device or specifically focuses on (or activates) a portion of an electronic device (e.g., less than the entirety of the electronic device). In other implementations, the set of inputs can execute a software code or part of the software code. The inputs can be provided, for example, to the electronic device for self-integrity validation. The inputs can include software code to be executed on the electronic device. In one implementation, for example, a user or a test engineer can specify particular test inputs. Alternatively, the input vector manager 104 can have a predefined list of inputs and select them in a predefined order.

The signature analyzer 106 can perform different signal processing approaches to extract discriminatory features from the side-channel information captured by the side-channel information detector 102 of the electronic device. The signature analyzer 106 can include an analog processor (not shown), an analog-to-digital converter (ADC) (not shown), and a digital signal processor (not shown) to process the measured side-channel information. For example, the signature analyzer 106 can have the sensor/detector connected to the analog processor and/or to the ADC, which is in turn connected to the digital signal processor. The analog processor can receive the side-channel information from the sensor/detector and perform signal conditioning and processing (e.g., reducing extraneous information that need not be digitized) before sending the side-channel information to the ADC to convert the analog data to digital signals. The digital signal processor can receive the digital signals converted by the ADC and generate frequency domain signal components of the digitized signals for frequency domain analysis. The digitized signals can also be stored for later processing.

The signature analyzer 106 can also extract discriminatory features from the side-channel information. Feature extraction can involve analysis, for example, of resonance frequencies, absorption frequencies, polarization, harmonic reflections, reflection arrival times, and/or signal strength. In some implementations, the signature analyzer 106 can compare the discriminatory features of the received side-channel information with the discriminatory features of the pre-defined side-channel information of a known device (a known trusted/authorized device or a known counterfeit/unauthorized device). The signature analyzer 106 can further generate a statistical analysis indicating the likelihood of the electronic device (i.e., the compute device being validated) is legitimate/authorized and/or functionally correct. In some instances, the signature analyzer 106 can generate a statistical analysis indicating the likelihood of the pluggable device, such as a USB flash drive, is legitimate/authorized and/or functionally correct.

The characteristic source 150 can include a physical hardware (e.g., a voltage generator, a current generator, a power generator, a voltage regulator, a current regulator, or a charging chip) to provide voltage, current, or power to other components of the electronic device. The characteristic (e.g., voltage, current, power, frequency, etc.) generated by the characteristic source 150 can be controlled, adjusted, and managed by the characteristic controller 108. In some implementations, the characteristic source 150 can be external to the characteristic management system 100, which remotely activates and/or controls the characteristic source 150. In situations where the characteristic management system 100 is an external component to the electronic device, the characteristic source 150 can be situated locally at the electronic device, instead of at the characteristic management system 100, such that the characteristic source 150 can be remotely activated and/or controlled by the characteristic management system 100.

The characteristic controller 108 can include a general purpose processor, a Field Programmable Gate Array (FPGA), an Application Specific Integrated Circuit (ASIC), a Digital Signal Processor (DSP), and/or the like. The characteristic controller 108 can be configured to monitor, control, and manage the characteristic source(s) 150. For example, the characteristic controller 108 can be configured to send a control signal to the characteristic source 150 such that the characteristic source 150 provides a constant voltage or current to other components of the electronic device. The characteristic controller 108 can be configured to identify the voltage and/or current used for an operation of the electronic device and send a signal to the characteristic source 150 such that the voltage/current can be adjusted to the specified voltage and/or current. The characteristic controller 108 can be configured to adjust the frequency of the voltage and the amplitude of the voltage to improve power consumption of the electronic device. In some implementations, the characteristic controller 108 can be included in the processor 190 and the processor 190 can be configured to perform the functions of the characteristic controller 108.

In some embodiments, when the signature analyzer 106 performs a statistical analysis indicating a probability of the electronic device being legitimate and functionally correct, the characteristic controller 108 can receive a signal from the signature analyzer 106, which triggers automatic actions that affect the electronic device in response to the probability of the target device being legitimate. Some of the actions/responses can include, but not limited to, turning off the power provided by the characteristic source 105, remediating when the electronic device is determined non-legitimate (such as shutting down the electronic device, notifying an entity of the anomaly, resetting the electronic device to a known state, etc.), returning the electronic device to a known state, altering the circuit function of the electronic device, activating another device, disabling control ports of the electronic device, notifying user of status and/or testing information the electronic device, triggering the electronic device for reboot and reinitiating virtualization, extra intelligence/analysis, collecting data for forensics purposes, collecting data for a blacklist for detecting future intrusions, and/or the like.

In some embodiments, the characteristic controller 108 can monitor a characteristic level (e.g., a frequency level, a voltage level) of the electronic device. If the characteristic controller 108 identifies that characteristic level has changed or will change, the characteristic controller 108 can send a signal to the input vector manager 104 such that different inputs can be selected to activate the electronic device or different instructions can be selected to be executed at the electronic device for better detection of the side-channel information.

In some embodiments, based on a signal received from the signature analyzer 106, the characteristic controller 108 can control the behavior of the characteristic source 150 such that the side-channel information signature analysis can be optimized. For example, the side-channel information detector 102 (or the characteristic controller 108) can monitor a characteristic level (e.g., a voltage level) of the characteristic source 150 (e.g., a voltage regulator) and send the detected characteristic level to the characteristic controller 108. When the characteristic controller 108 identifies a deviation of the detected characteristic level from the expected value of the characteristic level, the characteristic controller 108 can send a signal to the characteristic source 150 to adjust the characteristic level such that the characteristic level stays substantially within a range of the expected value of the characteristic level. In such situations when the characteristic level stays substantially within a range of the expected value of the characteristic level, the side-channel information signature analysis can better recognize normal and/or anomalous features of the side-channel information of the electronic device. In one implementation, when the characteristic level of the characteristic source 150 cannot be controlled to stay substantially within the range of the expected value of the characteristic level, the characteristic controller 108 can send to the signature analyzer 106 a signal indicating the abnormal value of the characteristic level. The signature analyzer 106 can compensate the side-channel information signature analysis using such information associated with the abnormal value of the characteristic level.

In some embodiments, the signature analyzer 106 can include an analog processing unit that can then send the received side-channel information to a digitizer to convert the analog data to digital signals. The analog processing unit performs signal conditioning and processing before digitization, and transforms input analog signals to monitor the spectrum of the side-channel information to reduce extraneous information that need not be digitized. For example, a basic structure of the analog processing unit includes a filter and a low-noise amplifier, to filter and amplify the received signals from probes. The characteristic controller 108 can be configured to adjust the filtering characteristic or current/voltage output of the characteristic source 150 to select feature-rich portions of the signal that can be used to better detect anomalies, or suppress frequencies that obscure recognition of normal and/or anomalous features. The filtering regulation can be performed by the characteristic controller 108 during an anomaly monitoring phase or a baselining phase of the normal side-channel characterization.

For example, in a baselining phase of the normal side-channel characterization process, the signature analyzer 106 can include crowd-source anomaly detection using population of similar devices. When a number of side-channel signature analysis systems are deployed, it is possible to follow a crowd-sourcing approach to establish a baseline, instead of a deliberate (or supervised) characterization campaign for each system. Such a side-channel signature analysis system can, with large numbers of sources, allow for the identification of normal and/or abnormal behaviors. To implement such an approach, the execution behavior from a large number of identical devices as a response from a specific request (i.e., input) is used for characterization in an unsupervised approach. A database of side-channel signatures can be generated with information such as code executed, model number, date of manufacture, temperature, and distributor to name a few. This database provides a baseline for comparison across a large user base with varied conditions. The characteristic controller 108 can be configured to adjust the filtering characteristic or current/voltage output of the characteristic source 150 during this baselining phase to enhance the features of normal operation or suppress frequencies that obscure recognition of normal features.

In some embodiments, the characteristic controller 108 can monitor the change of a characteristic (e.g., voltage, current or control signals) and use this information as a side-channel in the analysis section (indicative of intrusion or failure mode) by the signature analyzer 106. For example, the characteristic sources 150 can include a pulse modulation power source in which voltage is maintained by the number of pulses created by the power supply circuitry that charges a capacitor. Counting the number of pulses over an interval of time is representative of current flow and can be used as a side-channel for inferring power consumption in the signature analysis. For another example, the characteristic controller 108 can recognize that the power savings mode of the electronic device is not active even though the electronic device is idling. This may represent a form of power consumption attack on the electronic device (e.g., a mobile device).

In some embodiments, the characteristic controller 108 can send a signal to the characteristic source 150 to actively inject low-level signals into the device power (directly or indirectly through electric-magnetism (EM) coupling) to be able to better characterize the operation of the electronic device for anomalous behavior (such as malware, hardware Trojans, unauthorized firmware or software, age, and pending failures). For example, the non-linear characteristics and/or switching characteristics of the electronic device can alter the inserted signal, and if optimized, may provide more distinctive features for recognizing normal and abnormal behaviors.

In some embodiments, the electronic device (or a chip on the electronic device) can include a power management system (not shown in FIG. 1) which provides a constant voltage and/or current to the electronic device. The power management system can be configured to monitor and adjust the input voltage, current, and/or frequency of the input voltage of the electronic device. The characteristic controller 108 can control the power management system (and/or the power output from the power management system and input into the rest of the electronic device/chip). In such a situation, the characteristic controller 108 can control the characteristic source 150 (e.g., a power source) or control/modify the power output of the power management system. For example, the characteristic controller 108 can monitor a characteristic level (e.g., a voltage level) of the power management system. When the characteristic controller 108 identifies a deviation of the detected characteristic level from the expected value of the characteristic level, the characteristic controller 108 can send a signal to the power management system to adjust the characteristic level such that the characteristic level stays substantially within a range of the expected value of the characteristic level. In such situations when the characteristic level stays substantially within a range of the expected value of the characteristic level, the side-channel information signature analysis can better recognize normal and/or anomalous features of the side-channel information of the electronic device.

Figure 2:
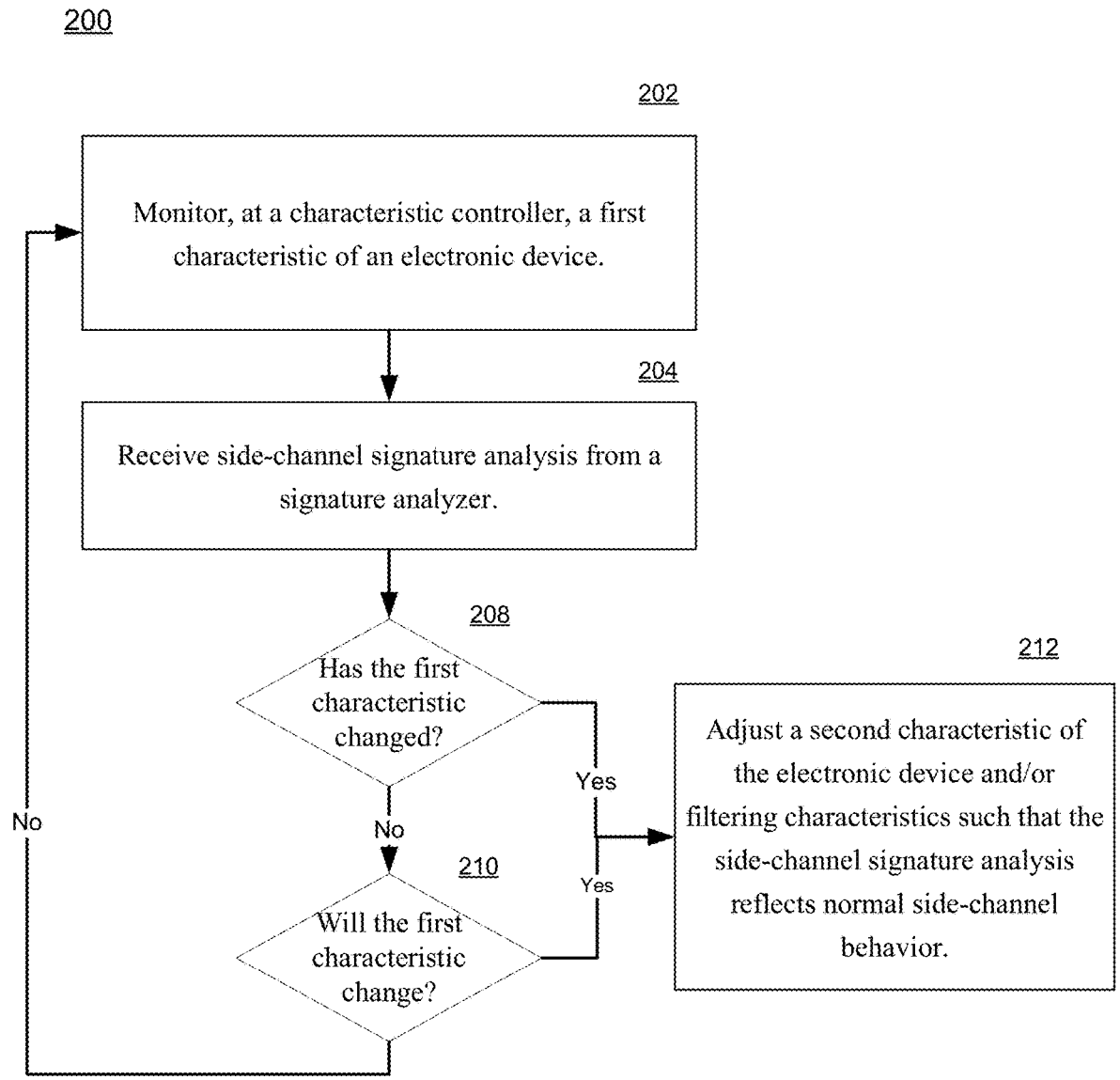
FIG. 2 is a flow chart showing the process of characteristic management with a side-channel signature analysis, according to an embodiment.

FIG. 2 is a flow chart showing the process of characteristic management with a side-channel signature analysis, according to an embodiment. The method of characteristic management with a side-channel signature analysis 200 can be executed at, for example, a characteristic controller such as the characteristic controller 108 shown and described with respect to FIG. 1. In some embodiments, the characteristic controller monitors a first characteristic of an electronic device at 202. The electronic device can be or include, for example, computers, cell phones, digital cameras, tablets, electrical circuit boards, critical embedded systems, coprocessors, field-programmable gate arrays (FPGAs), and/or electronic components. The first characteristic of the electronic device includes, for example, voltage, current, power, or frequency. The characteristic controller then receives a signal from a signature analyzer (such as the signature analyzer 106 described in FIG. 1) indicating side-channel signature analysis at 204. Such side-channel information represents a unique signature state (e.g., power) of the electronic device. The side-channel information can include, for example, indirect measure of program execution such as power consumption, electromagnetic emissions, and other physical signals such as current, voltage, temperature, vibration, light, delay, impedance, vibration, pressure, global positioning system coordinates, and/or the like.

For example, the side-channel signature analysis can indicate that an anomaly is detected at the electronic device based on a signature analysis of the side-channel information detected at the side-channel information detector (such as the side-channel information detector 102 described in FIG. 1). In response to receiving the signal indicating that an anomaly is detected at the electronic device, the characteristic controller implements remedial processes, such as shutting down the electronic device, notifying an entity of the anomaly, or resetting the electronic device to a known state.

For another example, when the side-channel signature analysis shows that the electronic device is operating normally without anomalies, the characteristic controller determines at 208 if a change to the first characteristic has happened. If the value of the first characteristic has not changed, the characteristic controller proceeds to determine at 210 that if the value of the first characteristic will change in a predefined period of time. For example, the value of the first characteristic may be programmed to be changed by the characteristic source periodically by a predefined interval, or at a predefined time. The value of the first characteristic may also be programmed to be changed when a criteria is met. If the value of the first characteristic will not change in the predefined period of time, in one implementation, the characteristic controller optionally proceeds to determine if another characteristic of the electronic device, other than the first characteristic, has changed or will change in a predefined period of time. In another implementation, the characteristic controller returns to step 202 to keep monitoring the value of the first characteristic of the electronic device.

If the characteristic controller determines the value of the first characteristic has changed or will change in a predefined period of time, the characteristic controller sends at 212 a signal to a characteristic source (such as the characteristic source 150 described in FIG. 1) to adjust a second characteristic (e.g., frequency, voltage, current, power) of the electronic device such that the side-channel signature analysis reflects expected side-channel behavior. The second characteristic can be the same as or different from the first characteristic. In another implementation, the characteristic controller adjusts filtering characteristics associated with signal processing at the signature analyzer such that frequencies which enhance the features of expected operation are allowed. The characteristic controller can also adjust the filtering characteristics associated with signal processing at the signature analyzer such that frequencies that obscure recognition of normal or anomalous features are suppressed. In one implementation, the process of characteristic management 200 can return to step 202 to continue monitoring the same and/or different characteristics of the electronic device such that the side-channel signature analysis reflects expected side-channel behavior.

Power Signature Analysis

A power signature analysis system, such as the characteristic management system 100 shown in FIG. 1, comprises three main elements common to all pattern recognition systems: sensing, feature extraction, and detection/classification. Power signature signals can be collected from an electronic device when the electronic device is operating (e.g., locally powered on) and/or when the electronic device is not operating (e.g., locally powered off). In some embodiments, when an excitation source, for example a Radio Frequency (RF) emitter, an electromagnetic interference (EMI) pulse, a white noise signal, a wide-band signal, and/or a frequency-swept signal, is applied to a target electronic device, an electromagnetic field(s) and/or wave(s) can be induced, reflected back, and/or absorbed by the target electronic device. Power is altered during the reflection of the EM field and/or wave(s) by the target electronic device. The propagated EM signals (thus the renewed power) vary depending on the integrity of the integrated circuits and/or electronic components within the target electronic device. In some instances, different components within the electronic device (such as processors, memories, circuit boards, etc.) can have different propagated EM signals (thus the received power). In some instances, when the components within the target electronic device are trusted components, the propagated EM signals (thus the received power) can vary based on the design (or arrangement) of the components within the target electronic device, which can indicate the counterfeit status of the target electronic device. Therefore, by measuring the propagated EM signals (or emission signals) from a target electronic device and comparing that with reference power signature signals from reference device(s) (e.g., pre-determined trusted devices, and/or pre-determine counterfeit devices), the integrity of the integrated circuits and/or electronic components within the target electronic device (e.g., the counterfeit status of the target electronic device) can be determined.

Characterization

The characterization process involves collecting and characterizing reference power signature signals of reference devices by repeatedly applying excitation to the reference devices (e.g., pre-determined trusted devices, and/or pre-determined counterfeit devices) in a controlled environment (including setting inputs used during excitation, and helping synchronizing traces). For better performance, the characterization should be an iterative, interdependent process. There are several options to facilitate and enhance the generation of reference power signature data including: crowd sourcing (e.g., by obtaining numerous references from multiple sources to define what is a power signature of a reference device), machine learning in the field (repeated observations of a power trace to define what historically constitutes a power signature of a reference device), and/or the like. For example, the reference power signature data generation can include crowd source pre-determined counterfeit devices.

Trace Processing And Feature Extraction

The process of preparing test traces (i.e., power signature signals of target devices) to be compared with the stored reference power signature signals is referred to herein as preprocessing and feature extraction. Trace preprocessing involves general tasks to condition the traces to extract the selected discriminatory features (or characteristics), e.g., converting the traces to the appropriate domain or aligning the traces in reference to a specific marker.

Another example of basic preprocessing is to align time-domain traces before being passed to a correlation detector. Time alignment of traces can be achieved with a correlation detector. In some instances, the correlation detector can be disposed within a characteristic management system such as the characteristic management system 100 shown in FIG. 1. The correlation detector can be any hardware and/or software module (stored in a memory such as the memory 180 in FIG. 1 and/or executing in hardware such as the processor 190 in FIG. 1).

In this example, each trace of N samples is considered as a point in a multidimensional Euclidean space. Feature extraction is the process of calculating the final test statistic (or discriminatory feature) from new traces which is passed to the detectors and used to determine integrity. This process is unique to each selected feature. For example, in basic time domain correlation analysis, preprocessing could include coarse synchronization and compensation for specific platform or packaging characteristics, while feature extraction involves comparing against the stored signature by calculating the correlation factor or the Euclidean distance.

Figure 3:
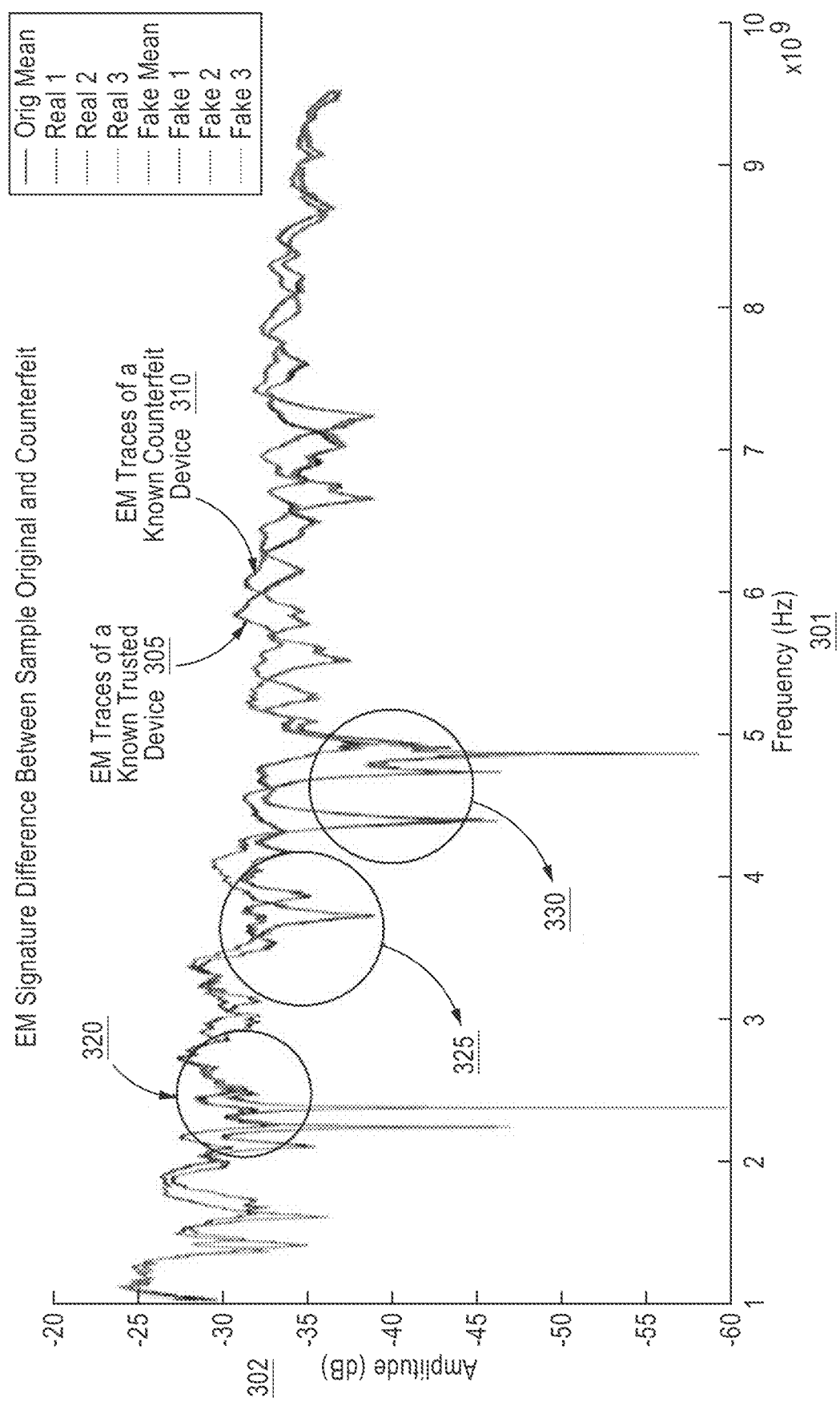
FIG. 3 is a graph showing reflected electromagnetic emission signals from a pre-determined trusted device and a pre-determined counterfeit device, according to an embodiment.

For example, FIG. 3 is a graph showing measured electromagnetic (EM) emission signals (also referred to herein as "traces") from a pre-determined (or known) trusted device and a pre-determined (or known) counterfeit device, according to an embodiment. A set of EM traces measured from a known trusted device 305 at different times shows amplitude changes 302 over frequency 301. A set of EM traces measured from a known counterfeit device 310 at different times shows amplitude changes 302 over frequency 301. The set of EM traces from the known counterfeit device 310, however, exhibits behaviors distinct from the behaviors of the set of EM traces from the known trusted device 305.

As shown in FIG. 3, the set of EM traces from the known trusted device 305 and the set of EM traces from the known counterfeit device 310 have been preprocessed. Specifically, the EM traces, 305 and 310, have been converted to the frequency domain 301. The set of EM traces from the known trusted device 305 and the set of EM traces from the known counterfeit device 310 have also been synchronized for the following feature extraction. Feature extraction involves extracting discriminatory features from the two sets of EM traces and comparing the discriminatory features to determine if a device is a counterfeit device. As shown in FIG. 3, discriminatory features at, for example, 320, 325, and 330 from the two sets of EM traces can be desirable to extract because they show distinct divergences between the two sets of EM traces.

In use, a target device with unknown counterfeit status can be measured in a characteristic management system (such as the characteristic management system 100 shown in FIG. 1.) A set of EM traces from the target device can be compared with a set of EM traces from a known trusted device. If no substantial divergence is found between the discriminatory features of the set of EM traces from the target device and the known trusted device, the target device can be determined to be trusted. On the other hand, if significant divergence (e.g., divergence exceeding a pre-defined threshold) is found between the discriminatory features of the set of EM traces from the target device and the known trusted device, the target device can be determined (or identified) to be a counterfeit device. Moreover, the set of EM traces from the target device can be compared with a set of EM traces from a known counterfeit device. If no significant divergence (e.g., divergence exceeding a pre-defined threshold) is found between the discriminatory features of the set of EM traces from the target device and the known counterfeit device, the target device can be determined to be counterfeit. On the other hand, similarly, if significant divergence is found between the discriminatory features of the set of EM traces from the target device and the known counterfeit device, the characteristic management system can proceed to compare the EM traces from the target device with the EM traces from other known counterfeit devices until a determination, with certain confidence level, on the counterfeit status of the target device can be made.

Detector Characteristics

Once the power signature signals have been extracted and the discriminatory features have been selected, the next step in the power signature analysis process is to design optimal detectors to perform the final integrity assessment. In some embodiments, the detector design is performed in advance to the characteristic management process (such as the process of characteristic management with a side-channel signature analysis described with respect to FIG. 2) such that the reference data from the pre-determined trusted devices (and/or pre-determined counterfeit devices) have been collected and processed prior to testing the target electronic devices. These detectors can make the final decision of whether a target electronic device should be considered a counterfeit. The process of detector design and normal monitoring operation are very similar. In detector design, the EM emission signals from the pre-determined trusted devices (and/or pre-determined counterfeit devices) are captured and processed to extract the selected discriminatory features and compared against the stored signatures. Several traces are collected and processed and their statistical sample distributions are used to identify a threshold that yields the expected performance targets.

Figure 4:
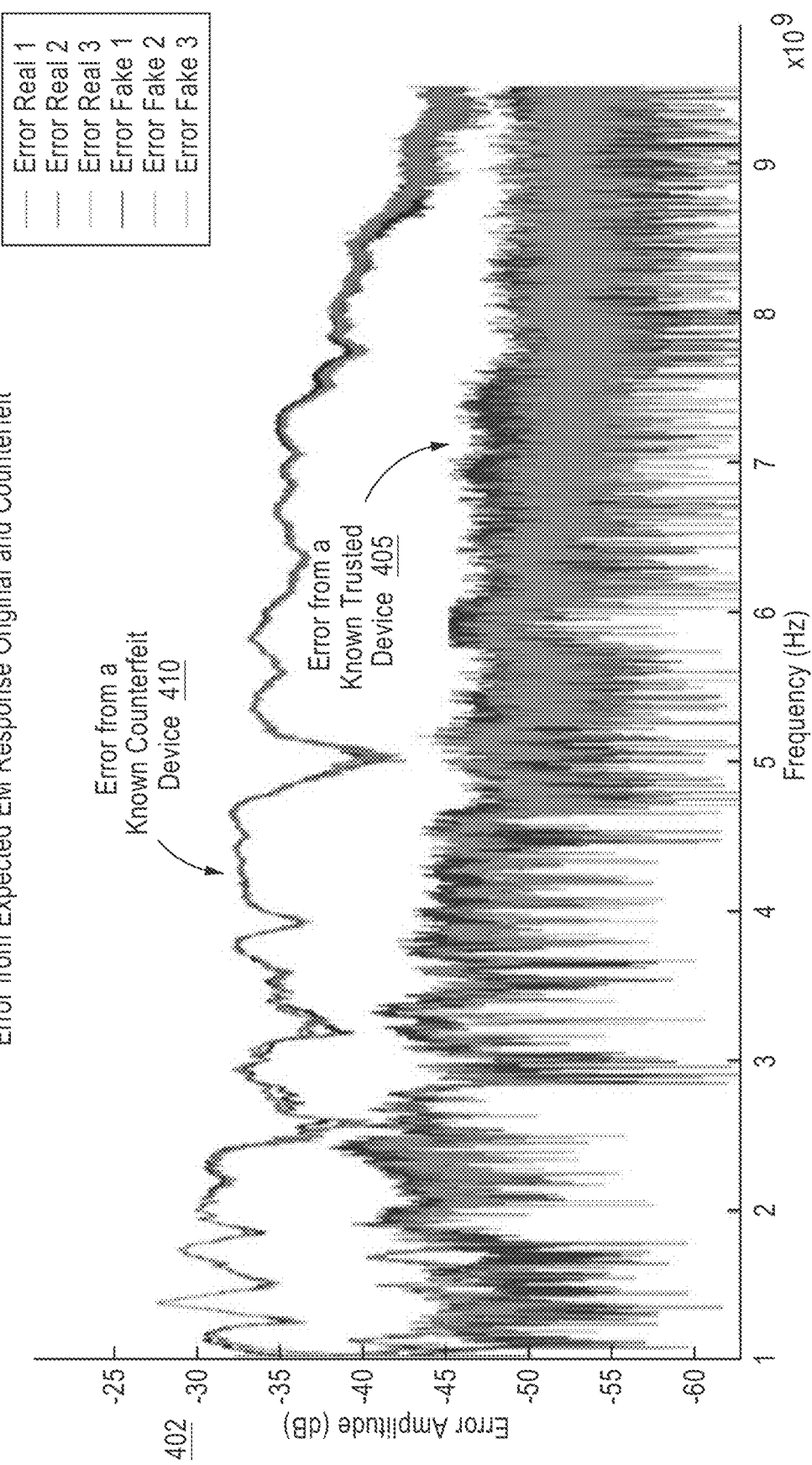
FIG. 4 is a graph showing error signals between an expected response and an observed response for a pre-determined trusted device and a pre-determined counterfeit device, according to an embodiment.

FIG. 4 is a graph showing error signals between an expected response and an observed response for a known trusted device and a known counterfeit device, according to an embodiment. The graph shows the error amplitude in dBs 402 of the reflected EM traces measured from the known trusted device 405 and the counterfeit device 410, versus frequency in Hz. As FIG. 4 shows, the error signals 402 for the known counterfeit device 410 are separated from the error signals 402 for the known trusted device 405, allowing for identification of other counterfeit devices, distinct from the known trusted device 405, according to the apparatus and method described herein.

Figure 5:
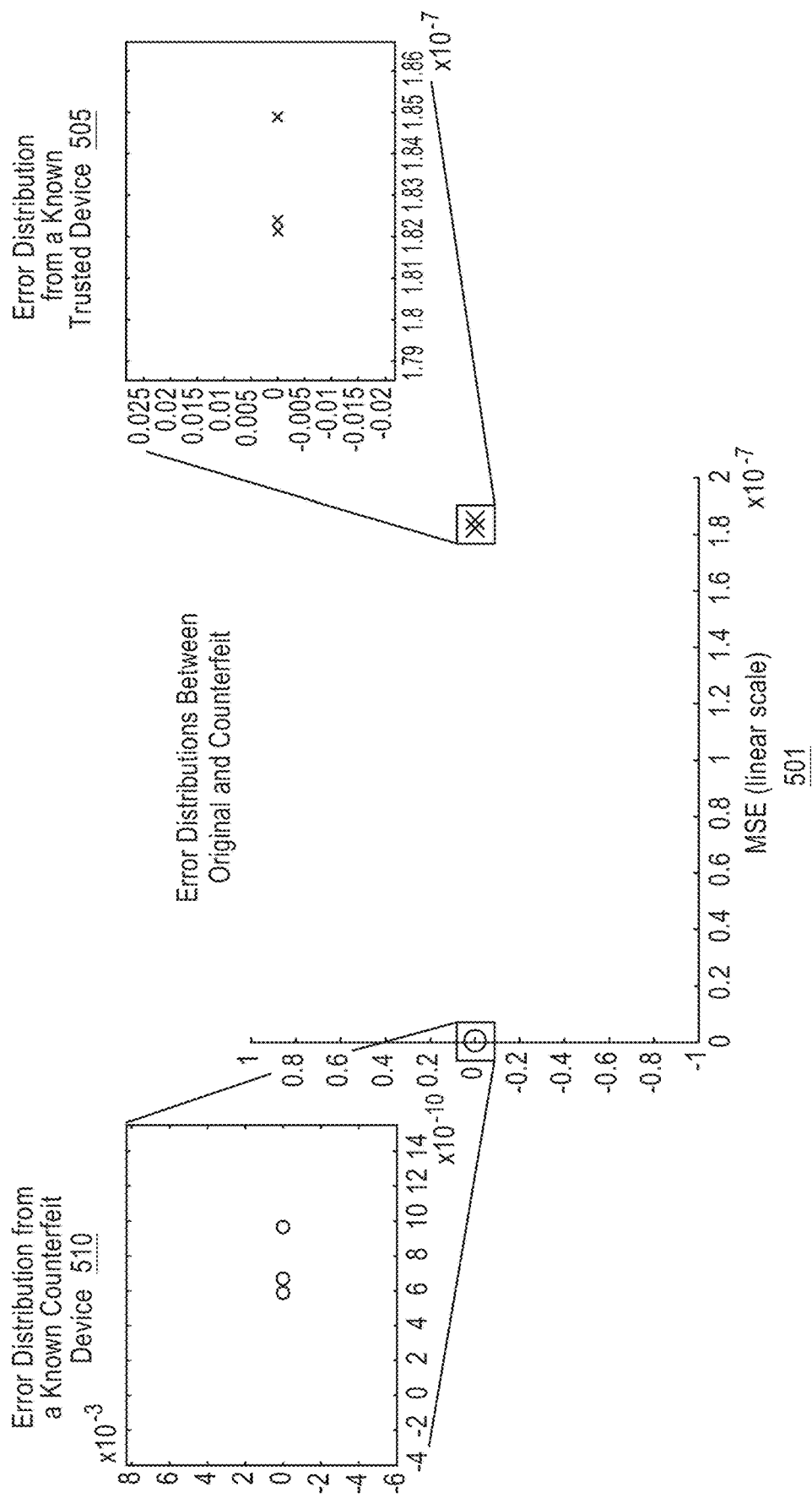
FIG. 5 is a graph showing error distributions of a pre-determined trusted device and a pre-determined counterfeit device, according to an embodiment.

FIG. 5 is a graph showing error distributions of a known trusted device 505 and a known counterfeit device 510, according to an embodiment. Using a difference vector, the final test statistic or discriminatory feature passed to the detector can be represented by the mean squared error (MSE) 501 or any other distance or error metric. Several traces are collected and processed and their statistical sample distributions are used to identify a threshold that yields the expected performance targets. Again, due to the separation between the error distribution for the known counterfeit device 510 and the error distribution for the known trusted device 505, identification of other counterfeit devices, distinct from the known trusted device 505 can be performed.

Figure 6:
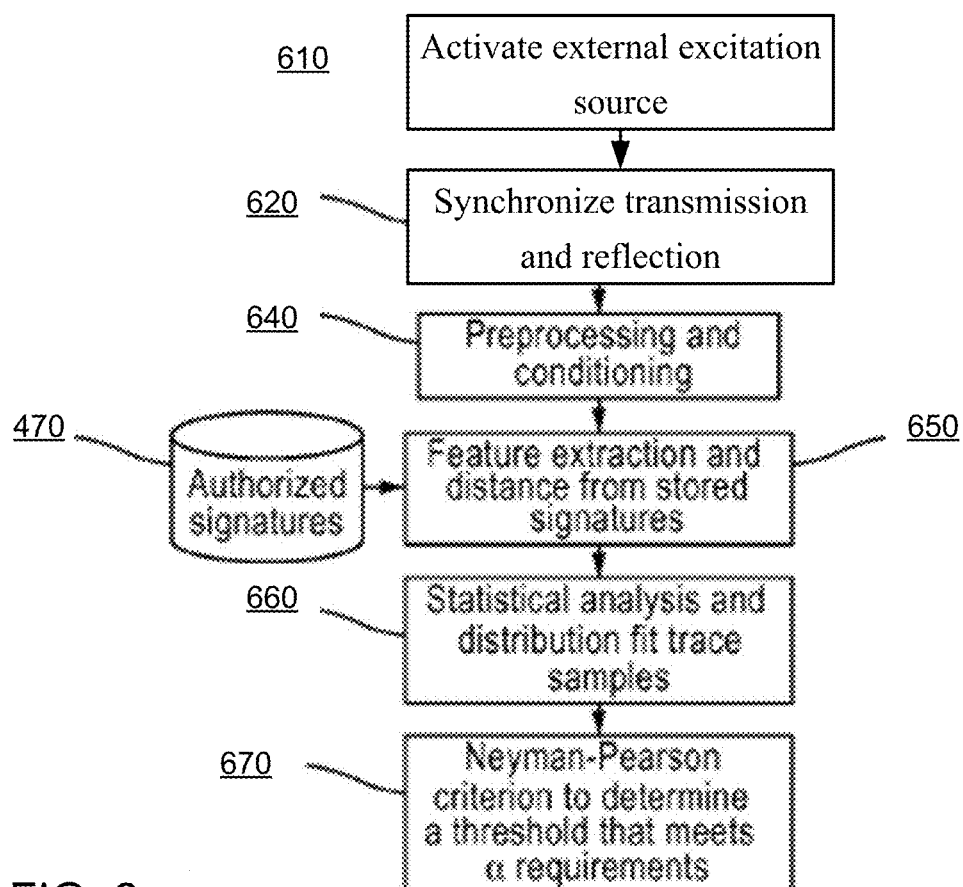
FIG. 6 is a flow chart showing a process of detector design, according to an embodiment.

An example of the process of detector design is shown in FIG. 6. An external excitation source is activated at 610. The parameters of the excitation source and the power signature detector are synchronized at 620, and the traces are preprocessed and conditioned at 640. Using authorized signatures at 470 for comparison, the selected discriminatory features are extracted and a distance metric is generated at 650. Then statistical analysis and distribution fitting is done at 660 on the resulting metrics. Finally, the Neyman-Pearson criterion is applied at 670 to determine a threshold that meets expected performance targets.

Figure 7:
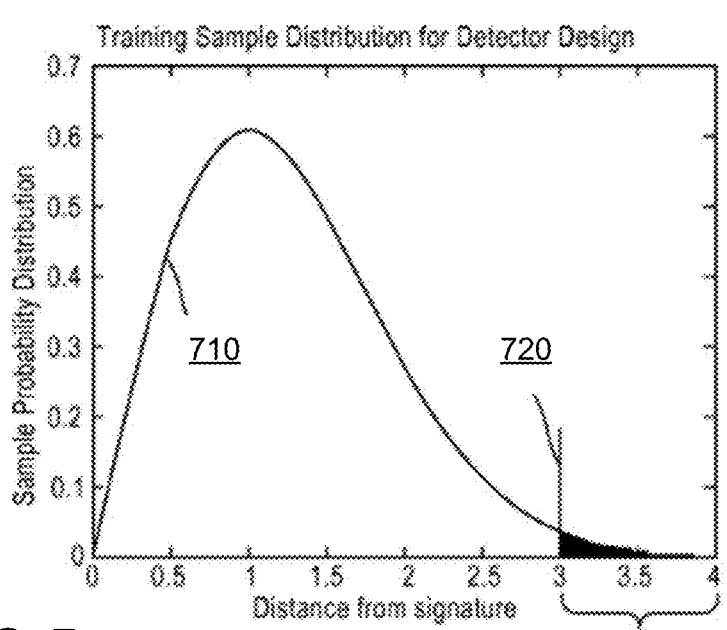
FIG. 7 is a graph showing sample probability distribution from trusted code execution used for detector design and threshold selection, according to an embodiment.

A common approach to design optimal detectors involves the application of the Neyman-Pearson criterion to maximize the probability of detection for a given probability of false alarm. As a brief reminder of this criterion, which is spawned from basic hypothesis testing theory, a target probability of false alarm is set based on the tolerance and estimated cost of making a mistake in the final decision. Using an estimate of the probability distribution of the discriminatory features from the pre-determined trusted devices (and/or pre-determined counterfeit devices), a distance threshold is calculated that yields the expected probability of false alarm while maximizing the probability of correct detection. An example of this process is shown in FIG. 7, in which a distance threshold 720 is calculated for a probability distribution 710 that yields an expected probability of false alarms 730.

There are different techniques that can yield improved results depending on the nature of the selected discriminatory features. Other techniques for detector design and machine training include: Neural Networks, Support Vector Machines, and Hidden Markov Models.

It is intended that the systems and methods described herein can be performed by software (stored in memory and/or executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including Unix utilities, C, C++, Java™, JavaScript (e.g., ECMAScript 6), Ruby, SQL, SAS®, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

What is claimed is:

1. An apparatus; comprising:
    a memory; and
    a processor communicatively coupled to the memory,
    the processor configured to monitor a first characteristic of an electronic device,
    the processor configured to perform side-channel signature analysis of the electronic device,
    the processor configured to determine if the first characteristic of the electronic device has changed or will change in a predefined period of time based on the side-channel signature analysis,
    the processor configured to adjust a second characteristic of the electronic device in response to determining that the first characteristic has changed or will change in the predefined period of time such that the side-channel signature analysis corresponds to predefined side-channel behavior, the second characteristic being different from the first characteristic.

2. The apparatus of claim 1, wherein the processor is configured to monitor the first characteristic of the electronic device that is physically collocated with the apparatus.

3. The apparatus of claim 1, wherein the processor is configured to monitor the first characteristic of the electronic device that is physically remote from the apparatus.

4. The apparatus of claim 1, wherein:
    the processor is configured to perform the side-channel signature analysis of the electronic device to detect an anomalous feature of the side-channel information,
    the processor is configured to adjust the second characteristic of the electronic device to improve detection of the anomalous feature of the side-channel information.

5. The apparatus of claim 1, wherein:
    the processor is configured to perform the side-channel signature analysis of the electronic device to detect an anomalous feature of the side-channel information,
    the processor is configured to send a signal to cause the electronic device to activate a set of instructions to improve detection of the anomalous feature of the side-channel information.

6. The apparatus of claim 1, wherein:
    the processor is configured to perform the side-channel signature analysis of the electronic device to detect an anomalous feature of the side-channel information based on a copy of reference side-channel information.

7. The apparatus of claim 1, wherein:
    the processor is configured to perform the side-channel signature analysis of the electronic device to detect an anomalous feature of the side-channel information based on a first copy of reference side-channel information stored at in the memory and a second copy of reference side-channel information at a location remote from the apparatus,
    the processor is configured to identify unauthorized modification to the apparatus when the side-channel signature analysis for the first copy of reference side-channel information differs from the side-channel signature analysis for the second copy of reference side-channel information.

8. The apparatus of claim 1, wherein the processor is configured to send a control signal to a power management system of the electronic device to modify a power output from the power management system to another portion of the electronic device and to cause a change in the first characteristic of the electronic device.

9. The apparatus of claim 1, wherein:
    the processor is configured to perform the side-channel signature analysis of the electronic device during a first time,
    the processor is configured to send a first control signal to a power management system of the electronic device to modify a first characteristic level output from the power management system to another portion of the electronic device and to cause a change in the first characteristic of the electronic device,
    the processor is configured to determine if the first characteristic level output from the power management system is outside of a predefined range,
    the processor configured to send a second control signal to the power management system in response to the first characteristic level being determined to be outside of the predefined range to adjust a second characteristic level output from the power management system to be with the predefined range during a second time in which the processor performs a side-channel signature analysis of the electronic device during the second time.

10. A non-transitory medium storing code representing a plurality of processor-executable instructions, the code comprising code to cause a processor to:
monitor a first characteristic of an electronic device;
adjust a second characteristic of the electronic device in response to a determination that the first characteristic has changed or will change in the predefined period of time, the second characteristic being different from the first characteristic;
perform side-channel signature analysis of a second characteristic of the electronic device representing side-channel information of the electronic device to detect an anomalous feature of the side-channel information based on a first copy of reference side-channel information stored locally with an apparatus having the processor and a second copy of reference side-channel information stored remotely from the apparatus; and
identify unauthorized modification to the apparatus in response to the side-channel signature analysis for the first copy of reference side-channel information differing from the side-channel signature analysis for the second copy of reference side-channel information.

11. The non-transitory medium of claim 10, the code further comprising code to cause the processor to:
adjust the second characteristic of the electronic device to improve detection of the anomalous feature of the side-channel information.

12. The non-transitory medium of claim 10, the code further comprising code to cause the processor to:
send a signal to cause the electronic device to activate a set of instructions to improve detection of the anomalous feature of the side-channel information.

13. The non-transitory medium of claim 10, the code further comprising code to cause the processor to:
receive an update to the first copy of reference side-channel information based on crowd-source updates to the reference side-channel of information for a plurality of electronic devices having a type corresponding to a type of the electronic device.

14. The non-transitory medium of claim 10, the code further comprising code to cause the processor to:
receive an update to the first copy of reference side-channel information based on crowd-source updates to the reference side-channel of information for a plurality of electronic devices having a type corresponding to a type of the electronic device,
the update to the first copy of reference side-channel information corresponding to an update to the second copy of the reference side-channel information.

15. The non-transitory medium of claim 10, the code further comprising code to cause the processor to:
send a control signal to a power management system of the electronic device to modify a power output from the power management system to another portion of the electronic device and to cause a change in the first characteristic of the electronic device.

16. The non-transitory medium of claim 10, wherein the code to perform the side-channel signature analysis includes code to perform the side-channel analysis during a first time, the code further comprising code to cause the processor to:
send a first control signal to a power management system of the electronic device to modify a first characteristic level output from the power management system to another portion of the electronic device and to cause a change in the first characteristic of the electronic device;
determine if the first characteristic level output from the power management system is outside of a predefined range; and
send a second control signal to the power management system in response to the first characteristic level being determined to be outside of the predefined range to adjust a second characteristic level output from the power management system to be with the predefined range during a second time in which the processor performs a side-channel signature analysis of the electronic device during the second time.

17. A non-transitory medium storing code representing a plurality of processor-executable instructions, the code comprising code to cause a processor to:
receive an update to a first copy of reference side-channel information to produce an updated first copy of the reference side-channel information based on crowd-sourced updates to the reference side-channel of information for a plurality of electronic devices having a type and corresponding to a type of an electronic device;
store the updated first copy of the reference side-channel information at an apparatus having the processor;
perform side-channel signature analysis of side-channel information of the electronic device to detect an anomalous feature of the side-channel information based on the updated first copy of reference side-channel information and a second copy of reference side-channel information stored remotely from the apparatus, the updated first copy of reference side-channel information corresponding to an update to the second copy of the reference side-channel information; and
identify unauthorized modification to the apparatus or the electronic device in response to the side-channel signature analysis for the updated first copy of reference side-channel information differing from the side-channel signature analysis for the second copy of reference side-channel information.

18. The non-transitory medium of claim 17, the code further comprising code to cause the processor to:
monitor a first characteristic of the electronic device; and
adjust a second characteristic of the electronic device in response to a determination that the first characteristic has changed or will change in the predefined period of time, the second characteristic being different from the first characteristic,
the code to perform includes code to perform side-channel signature analysis of the second characteristic of the electronic device representing side-channel information of the electronic device to detect the anomalous feature of the side-channel information.

19. The non-transitory medium of claim 17, wherein the crowd-sourced updates to the reference side-channel of information are for the plurality of electronic devices having at least one of executed code, a model number, a date of manufacture, a temperature or a distributor and corresponding to the at least of the executed code, the model number, the date of manufacture, the temperature or the distributor of the electronic device.

20. The non-transitory medium of claim 17, wherein the code to receive includes code to receive the update to the first copy of the reference side-channel information from a database that stores the crowd-sourced updates.

* * * * *